(12) United States Patent
Akiyama et al.

(10) Patent No.: US 6,965,650 B2
(45) Date of Patent: Nov. 15, 2005

(54) DIGITAL MODULATION TYPE SIGNAL TRANSMISSION APPARATUS AND METHOD OF DISPLAYING RECEIVED SIGNAL IN THE SIGNAL TRANSMISSION APPARATUS

(75) Inventors: Toshiyuki Akiyama, Tokorozawa (JP); Tetsuomi Ikeda, Machida (JP)

(73) Assignees: Hitachi Kokusai Electric, Inc., Tokyo (JP); Nippon Hoso Kyokai, Tokyo (JP)

( * ) Notice: Subject to any disclaimer, the term of this patent is extended or adjusted under 35 U.S.C. 154(b) by 689 days.

(21) Appl. No.: 09/884,091

(22) Filed: Jun. 20, 2001

(65) Prior Publication Data

US 2001/0055345 A1    Dec. 27, 2001

(30) Foreign Application Priority Data

Jun. 23, 2000  (JP) ............................. 2000-189882

(51) Int. Cl.[7] .......................... H04L 23/02; H04L 5/12; H04L 27/20
(52) U.S. Cl. ...................... 375/261; 375/308
(58) Field of Search ................. 375/260, 261, 375/295, 298, 308, 329, 330, 332; 370/203, 370/206, 207, 208, 345, 464, 498, 500; 348/473, 348/486, 723, 724

(56) References Cited

U.S. PATENT DOCUMENTS

| | | | | |
|---|---|---|---|---|
| 6,538,986 B2 * | 3/2003 | Isaksson et al. | ............ | 375/261 |
| 6,608,843 B1 * | 8/2003 | Murakami et al. | .......... | 370/500 |

FOREIGN PATENT DOCUMENTS

| EP | 0951151 | 10/1999 |
|---|---|---|
| JP | 59122158 | 7/1984 |
| JP | 884166 | 3/1996 |
| JP | 10336141 | 12/1998 |
| JP | 2001148676 | 5/2001 |
| WO | 9965173 | 12/1999 |

OTHER PUBLICATIONS

"The Journal of the Institute of Image Information and Television Engineers", vol. 52, No. 11, 1998, pp. 1539-1545 and pp. 1658-1665.

M. Takada, "Transmission Performance Depending on OFDM Symbol Duration and Scattered Pilot for Digital Terrestrial Broadcasting", The Institute of Image Information and Television Engineers, vol. 52, No. 11, pp. 1685-1665, 1998.

Y. Murakami, et al "A New Design of Pilot Symbol in 16QAM Channels", IEEE 51st Vehicular Technology Conference Proceedings, Tokyo, Japan, vol. 3 of 3, Conf. 51, May 15, 2000, pp. 2064-2068.

"Digital Video Broadcasting (DVB)", European Standard (Telecommunication Series), ETSI EN 300 744, Mar. 1997, pp. 25-34.

* cited by examiner

*Primary Examiner*—Betsy L. Deppe
(74) *Attorney, Agent, or Firm*—Mattingly Stanger Malur & Brundidge, P.C.

(57) ABSTRACT

A signal transmission apparatus for a digital modulation type, wherein each of information codes is assigned to any one of a plurality of signal points arranged on an I-Q complex plane, a pilot signal used for demodulating said information codes and an auxiliary signal are assigned to be arranged on signals points on the I-Q complex plane, a signal modulated based on coordinates corresponding to the assigned signal points is transmitted, the transmitted signal is received, and the received signal is demodulated to reproduce the information codes, and wherein the signal points of said auxiliary signal and said pilot signal are arranged on different positions on said I-Q complex plane.

14 Claims, 7 Drawing Sheets

△ : SIGNAL POINT OF AUXILIARY SIGNAL
◇ : SIGNAL POINT OF PILOT SIGNAL
○ : SIGNAL POINT OF RECEIVED SIGNAL
✕ : MOVED SIGNAL POINT OF RECEIVED SIGNAL
I : I - AXIS
Q : Q - AXIS

FIG.8

|  | POLARITY | I-COMPONENT | Q-COMPONENT |
|---|---|---|---|
| ADDRESS FOR PILOT SIGNAL | 0 | +1100 | 0 |
|  | 1 | -1100 | 0 |
| ADDRESS FOR AUXILIARY SIGNAL | 0 | 0 | +1100 |
|  | 1 | 0 | -1100 |

US 6,965,650 B2

DIGITAL MODULATION TYPE SIGNAL TRANSMISSION APPARATUS AND METHOD OF DISPLAYING RECEIVED SIGNAL IN THE SIGNAL TRANSMISSION APPARATUS

BACKGROUND OF THE INVENTION

The present invention relates to a digital modulation signal transmission apparatus of an orthogonal frequency division multiplex modulation (OFDM) scheme which uses a pilot signal for demodulating a modulated signal, and more particularly, to a digital modulation signal transmission apparatus which enables transmission of an auxiliary signal in addition to a signal modulated with main information codes and pilot signals, as well as to a signal display method for visualizing a received signal.

It should be first noted that, when used herein, the information code refers to an encoded signal which represents main information to be transmitted such as video information, audio information and other data information; the pilot signal refers to a reference signal which is utilized as the basis for the phase and amplitude of a received signal when it is demodulated; and the auxiliary signal refers to a signal other than the information code and the pilot signal, as will be described later in detail.

In recent years, in the field of radio devices, the OFDM scheme has been in the limelight as a modulation scheme robust against multipath fading. A large number of applied studies on the OFDM are now under progress in the fields of next-generation television broadcasting, FPU (Field Pickup Unit), radio LAN and so on in many countries including European countries and Japan.

Here, the OFDM scheme is an acronym of an orthogonal frequency division multiplexing modulation in which information codes are transmitted by using a plurality of carriers orthogonal to one another. The trends of developments in OFDM-based UHF-band terrestrial digital broadcasting and associated schemes are disclosed in detail in "The Journal of the Institute of Image Information and Television Engineers", Vol. 52, No. 11, pp. 1539–1545 and pp. 1658–1665 (1998).

As an example of the prior art, the UHF-band terrestrial digital broadcasting system in Japan will be described below. It should be noted however that this scheme involves an extremely complicated configuration, so that the following description will be made on the system which is simplified to such an extent that is required for understanding the present invention.

Beginning with description on the structure of a carrier in this broadcasting system, as illustrated in FIG. 4, this system uses a total of approximately 1,400 carriers within a frequency band W which is divided into 13 segments such that information codes of up to three channels (three layers) can be simultaneously transmitted. In a case that the information codes for three channels are transmitted, for example, about 470 carriers are used for each channel.

In this event, the number of segments and a modulation method used in each layer can be freely selected from several modes as shown in the above-mentioned documents. Within such selectable modes, a mode in which all segments are modulated in accordance with the same synchronous modulation scheme such as 64QAM (Quadrature Amplitude Modulation) can be applied as it is to other transmitters such as FPU.

Now, referring to FIG. 5, a prior art OFDM system based on the synchronous modulation will be described below in greater detail for an example in which all segments are modulated in accordance with the same 64QAM scheme to transmit information codes on one layer. FIG. 5 is a diagram representing the structure of the carriers of segments which are modulated in accordance with the synchronous modulation scheme, and only shows a low end portion of the frequency band in FIG. 4.

In a mode which uses all segments for transmission of information codes on one layer, it may be thought that a similar structure is repeated over the entire band.

In FIG. 5, the horizontal direction represents the frequency; the vertical direction, the lapse of time; and squares "□" arrayed in the horizontal and vertical directions each represent one carrier. Thus, one column of carriers "□" arranged in the horizontal direction with in the whole frequency band represents one symbol which forms part of an OFDM signal.

Further, a carrier "□" with "SP" inscribed within the square represents the position of a carrier for a pilot signal which is used for reproducing a reference signal during demodulation, while a carrier without any inscription within the square represents the position of a carrier for a signal modulated in accordance with the 64QAM scheme. As can be seen in FIG. 5, since the pilot signals are scattered both in the frequency direction and the time direction, they are designated as "SP" (Scattered Pilot).

As shown in FIG. 6, a signal modulated in accordance with the 64QAM scheme is represented by any of 64 signal points indicated by broken line circles on a complex plane defined by an I-axis (real axis) and a Q-axis (imaginary axis) which are orthogonal to each other, wherein the respective signal points are corresponded to 6-bit codes which are different from one another. For example, a signal point b on the I-Q complex plane in FIG. 6 is corresponded to a code "000001".

The modulation processing in accordance with the 64QAM scheme involves dividing a sequence of input information codes in units of six bits, assigning each of the divided 6-bit codes to any one of the 64 signal points on the I-Q complex plane. Each of the 6-bit codes is converted to a signal corresponding to the coordinate of I-Q complex plane representing a signal point indicated by a solid line circle "○" in FIG. 6, and outputting the converted signal.

On the other hand, the transmission signal is affected by noise and other interference during a transmission process and distorted (its amplitude and phase have changed). For example, a signal point indicated by circle "○" in FIG. 6 for a transmitted signal c, when received, has moved to a position c' indicated by a cross "×" in FIG. 6.

The demodulation processing in accordance with the 64QAM scheme involves selecting the signal point closest to the signal point for the received signal represented by "×", from 64QAM signal points indicated by broken line circles in FIG. 6, and outputting a 6-bit code corresponding to the selected signal point. For example, a received signal indicates a signal point c' as shown in FIG. 6, a signal point c is selected.

Therefore, for the demodulation processing, the correct signal point position indicated by the broken line circle associated with the received signal must be reproduced and detected. The reproduction of the position only require to find, for example, the direction and magnitude of a reference signal vector which represents the correct position of a coordinate point "a" of a pilot signal as a standard of the signal space in FIG. 6. A solid line rhomb "◊" superimposed on the position of the coordinate point a in FIG. 6 represents the position of the signal point for the pilot signal SP. In other words, the pilot signal SP represents the reference signal vector.

The directions and magnitudes of the reference signal vector and other signal vectors of a received signal have been affected by multipath and so on, which may occur on a transmission path between the transmission side and the reception side, causing the phase to rotate and the amplitude to change as well, as shown in FIG. 7. It is therefore necessary to reproduce the correct signal vectors on the reception side based on the received reference signal vector (pilot signal). Since the reference signal vector is required for each carrier, the reference signal vector must be determined for a carrier without the pilot signal SP as well, based on a nearby pilot signal SP.

Here, while the phase and magnitude of the reference signal vector change every time or from one carrier to another, as described above, the manner of changing is generally expressed by a smooth curve and has a remarkable correlation in the time direction and in the carrier direction (frequency direction).

For this reason, the reference signal vector for a modulated signal A of an arbitrary carrier of an arbitrary symbol in FIG. 5 can be readily found by interpolation of a plurality of sporadically transmitted SP signals. FIG. 5 shows exemplary positions of SP signals which facilitate efficient interpolation.

In recent years, a transmitter of a digital modulation scheme makes good use of the features of digital signals, and specifically inserts, other than a main signal which is modulated with information codes and a pilot signal, additional information such as control information representative of the type of a modulation method or an error correcting code used in transmission of main information codes, an audio signal or a signal for controlling of a pan head of a camera located at a transmission destination, and so on as auxiliary signals separate from the main information signal and pilot signal. The inserted auxiliary signals are transmitted together with other signals associated therewith.

Likewise, the UHF-band terrestrial digital broadcasting system in Japan defines a method of inserting a carrier for transmitting TMCC (control information: Transmission and Multiplexing Configuration Control) and a carrier for transmitting AC (Auxiliary Channel) as auxiliary signals within the carrier structure illustrated in FIG. 5 for transmission. In this event, as a modulation method for the auxiliary signals such as TMCC and AC, a DBPSK-based (Differential Binary Phase Shift Keying) transmission immune to noise and distorted waveform is generally used such that the information can be transmitted even in any severe conditions.

Then, the auxiliary signals modulated in accordance with the DBPSK scheme are set at positions on one of axes on the complex plane on which a signal point for a pilot signal is defined, for example, the I-axis (real axis) direction. Specifically, as shown in FIG. 6, a signal point AUX shown by "Δ" used for transmitting an auxiliary signal is set in the same direction and same magnitude as the signal point "a" shown by "◊" used for transmitting the pilot signal with respect to the origin. Therefore, the signal point "a" for the pilot signal is superimposed on the signal point for the auxiliary signal on the I-axis. It should be noted however that FIG. 6 shows the signal point "a" for the pilot signal and the signal point AUX for the auxiliary signal displaced from each other for purposes of promoting the understanding of the description.

Therefore, two signal points "AUX" found on extreme left and right sides on the I-axis represent the positions at ends of a signal point which moves to the right and to the left on the I-axis, as a result of the modulation in accordance with the DBPSK scheme or BPSK scheme. The aforementioned auxiliary signal is modulated and transmitted as a position on the I-axis. The pilot signal is also modulated in accordance with the BPSK scheme.

Additionally saying for reference, the DVB-T (Digital Video Broadcasting-Terrestrial) system, which is a terrestrial digital television system in Europe, has substantially the same configuration as the terrestrial digital broadcasting system in Japan.

In the digital modulation scheme as described above, adjustments of a receiver are generally made for signal points for all demodulated carriers using a vector scope or an oscilloscope by displaying corresponding positions on the complex plane (constellation) shown in FIG. 6 in order and at a high speed. That is, an operator adjusts the receiver as he or she is monitoring dispersion and shifting of average position of the displayed signal points.

Particularly, since the pilot signal SP and auxiliary signal TMCC for transmitting information on a modulation method for use in demodulation play very important roles in demodulating main information signals which have been modulated in accordance with the 64QAM scheme, it is necessary to carefully examine their adjustment conditions and receiving conditions.

In this context, since the DBPSK scheme is not related directly to the synchronous modulation scheme for transmitting main information, DBPSK-based signal points need not be observed for adjusting signal processing circuits for the synchronous modulation scheme.

However, since the OFDM scheme involves a large number of carriers and a complicated signal structure, particular carriers are affected by extremely high noise in the transmission path. For this reason, displaying of signal points for signals modulated in accordance with the DBPSK scheme will facilitate analyses on causes of failures and adjustments of signal processing circuits.

Particularly, in an OFDM-based transmitter, this adjustment while viewing the constellation is an even more important and indispensable method since it serves as a powerful tool for adjusting the receiver. For this reason, the foregoing adjustment accompanied with a displayed constellation of signal points has been widely used from before in the OFDM-based receiver as well.

The prior art has a problem in that no careful attention is paid to a manner of displaying signal points on the constellation, so that sufficient adjustments cannot be made although signal points are displayed on the constellation at great pains. Specifically, as is apparent from FIG. 6, when the amplitude at a signal point "AUX" for an auxiliary signal modulated in accordance with the DBPSK scheme is superimposed on the amplitude at a signal point "a" for a pilot signal, these signals cannot be distinguished from each other on the display.

As a result, it is difficult to determine whether a signal point under observation is a signal point for an auxiliary signal or a moved signal point for a pilot signal due to its distortion or the like, thereby making the adjustment more difficult on the contrary.

SUMMARY OF THE INVENTION

It is an object of the present invention to provide a digital modulation type signal transmission apparatus which is capable of distinctly observing signal points for a pilot signal and an auxiliary signal to facilitate an analysis on causes of a failure in the transmission apparatus and works involved in adjustments of the same, and a method of displaying received signals in the signal transmission apparatus.

A digital modulation signal transmission apparatus according to the present invention, digitally modulates a plurality of signals for transmission including a transmission side and a reception side, said transmission side comprising: a input terminal to which information codes are applied; a first modulation circuit coupled with said input terminal, for assigning each of information codes to any one of a plurality of signal points arranged on an I-Q complex plane and converting the information codes to first signals corresponding to coordinates of the assigned signal points; a second modulating circuit for assigning a pilot signal used for demodulating said information codes and an auxiliary signal including TMCC information to be arranged on different signal points on the I-Q complex plane and converting the pilot signal and the auxiliary signal to respective second signals corresponding to coordinates of the assigned signal points, and a transmission unit coupled with the first and second modulation circuit for transmitting the first and second signals.

In a digital modulation signal transmission apparatus for digitally modulating a plurality of signals for transmission, including a transmission side and a reception side, a method of displaying a received signal in said reception side according to the present invention, comprises a step of receiving a transmission signal in which each of information codes are assigned to any one of a plurality of signal points arranged on an I-Q complex plane, a pilot signal used for demodulating said information codes and an auxiliary signal including TMCC information are assigned to be arranged on different signals points on the I-Q complex plane, said transmission signal being a signal modulated based on coordinates corresponding to the assigned signal points; displaying said I-Q complex plane on a screen of a display device provided at a reception side; displaying a signal point of the information code demodulated from said received transmission signal on said I-Q complex plane; displaying a signal point of said pilot signal demodulated from said received signal on a predetermined first position on said I-Q complex plane; and displaying a signal point of said auxiliary signal demodulated from said received transmission signal on a predetermined second position different from said first position on said I-Q complex plane.

A signal transmission/reception system for a digital modulating according to the present invention, wherein each of information codes is assigned to any one of a plurality of signal points arranged on an I-Q complex plane, a pilot signal used for demodulating said information codes and an auxiliary signal are assigned to be arranged on signals points on the I-Q complex plane, a signal modulated based on coordinates corresponding to the assigned signal points is transmitted, the transmitted signal is received, and the received signal is demodulated to reproduce the information codes, and wherein the signal points of said auxiliary signal and said pilot signal are arranged on different positions on said I-Q complex plane.

According to an embodiment of the present invention, the pilot signal and the auxiliary signal may be modulated in accordance with one of a BPSK scheme and a DBPSK scheme, wherein a direction of a signal point for use in modulating the auxiliary signal may be oriented at a right angle to a direction of a signal point for use in modulating the pilot signal.

Further, according to an embodiment of the present invention, the digital modulation type signal transmission apparatus may conform to an orthogonal frequency division multiplex modulation scheme for transmitting the information code with a plurality of carriers orthogonal to one another, wherein the modulation scheme may be an OFDM scheme which has carriers for modulating the information code in accordance with a modulation method to which synchronous detection can be applied. The present invention can also be applied to a digital modulation type signal transmission system using a single carrier which transmits information codes, a pilot signal and an auxiliary signal in time-divisional scheme.

According to the present invention, the auxiliary signal and the pilot signal are different in position on the I-Q plane, so that the signal point for the pilot signal and the signal point for the auxiliary signal can be completely separated and observed simultaneously. It is therefore possible to realize a transmission apparatus of digital modulation scheme which facilitates an analysis on causes of a failure in the transmission apparatus and adjustment operations on the transmission apparatus. Moreover, this effect can be provided without modifying the performance of a conventional transmission apparatus using a known modulation method.

BRIEF DESCRIPTION OF THE DRAWINGS

FIG. 8 shows an example of a mapping table.

DESCRIPTION OF THE EMBODIMENTS

A digital modulation type signal transmission apparatus according to the present invention will hereinafter be described in detail in connection with an illustrated embodiment.

Figure 1:
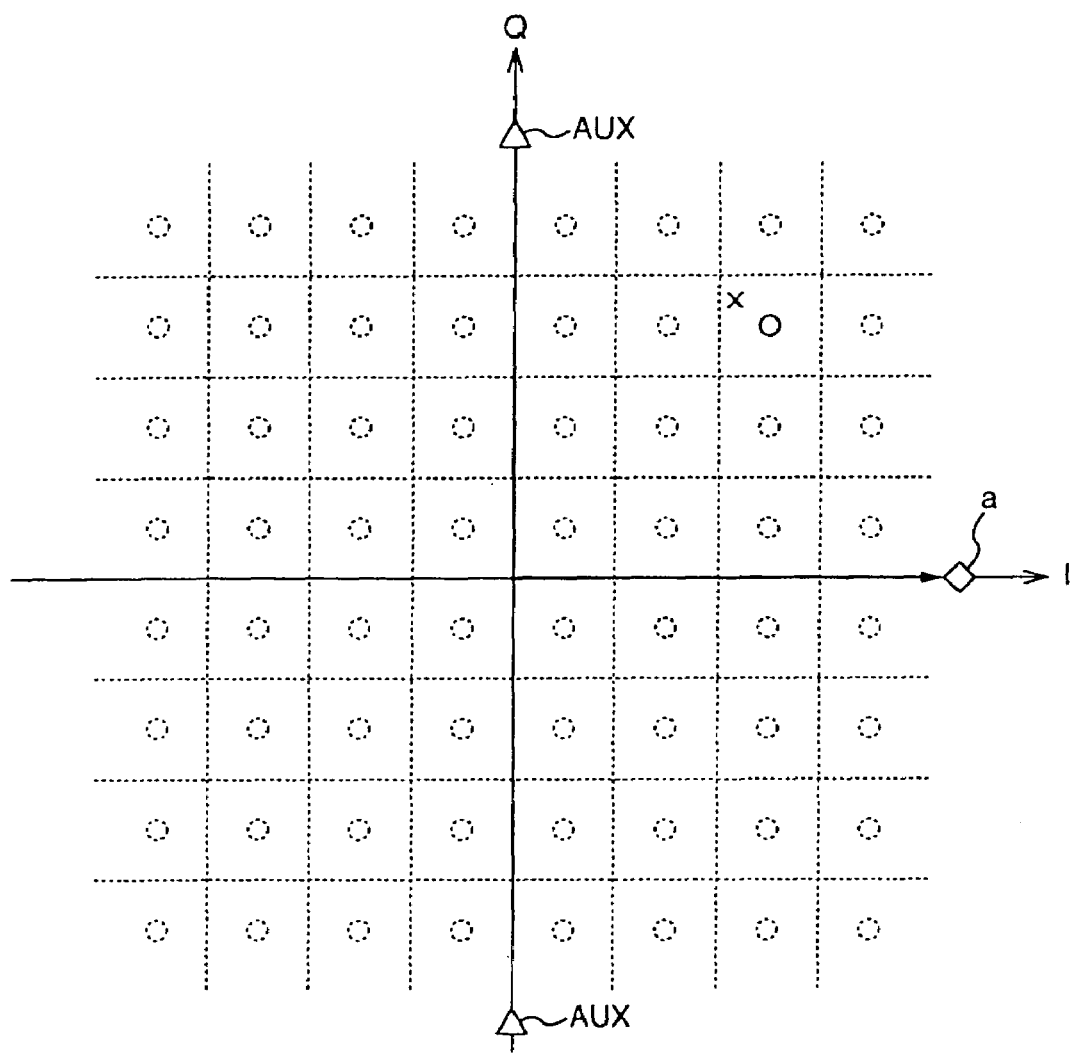
FIG. 1 is an explanatory diagram for-showing positioning of signal points in a first embodiment of a digital modulation type signal transmission apparatus according to the present invention.
Figure 6:
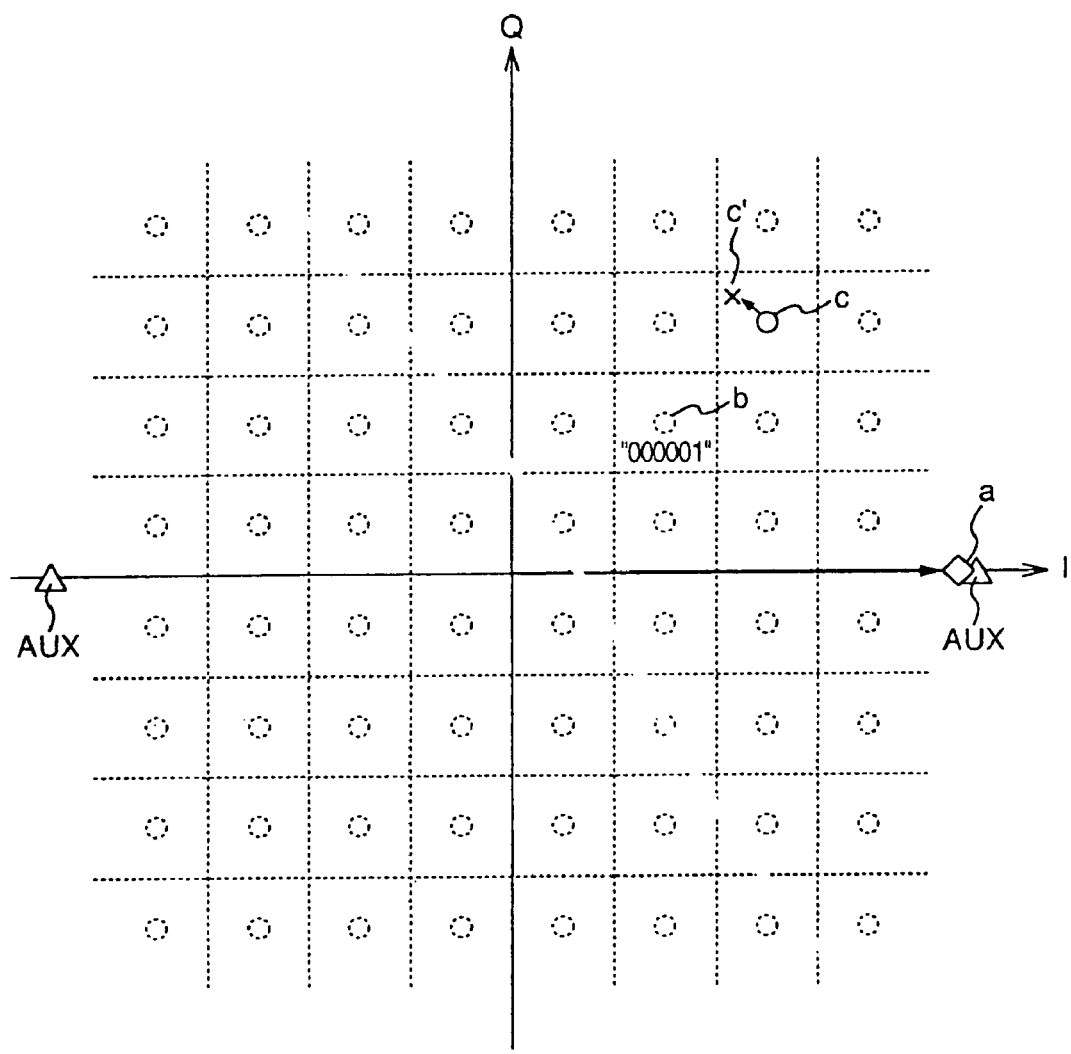
FIG. 6 is an explanatory diagram showing exemplary positioning of 64QAM-based signal points.
Figure 7:
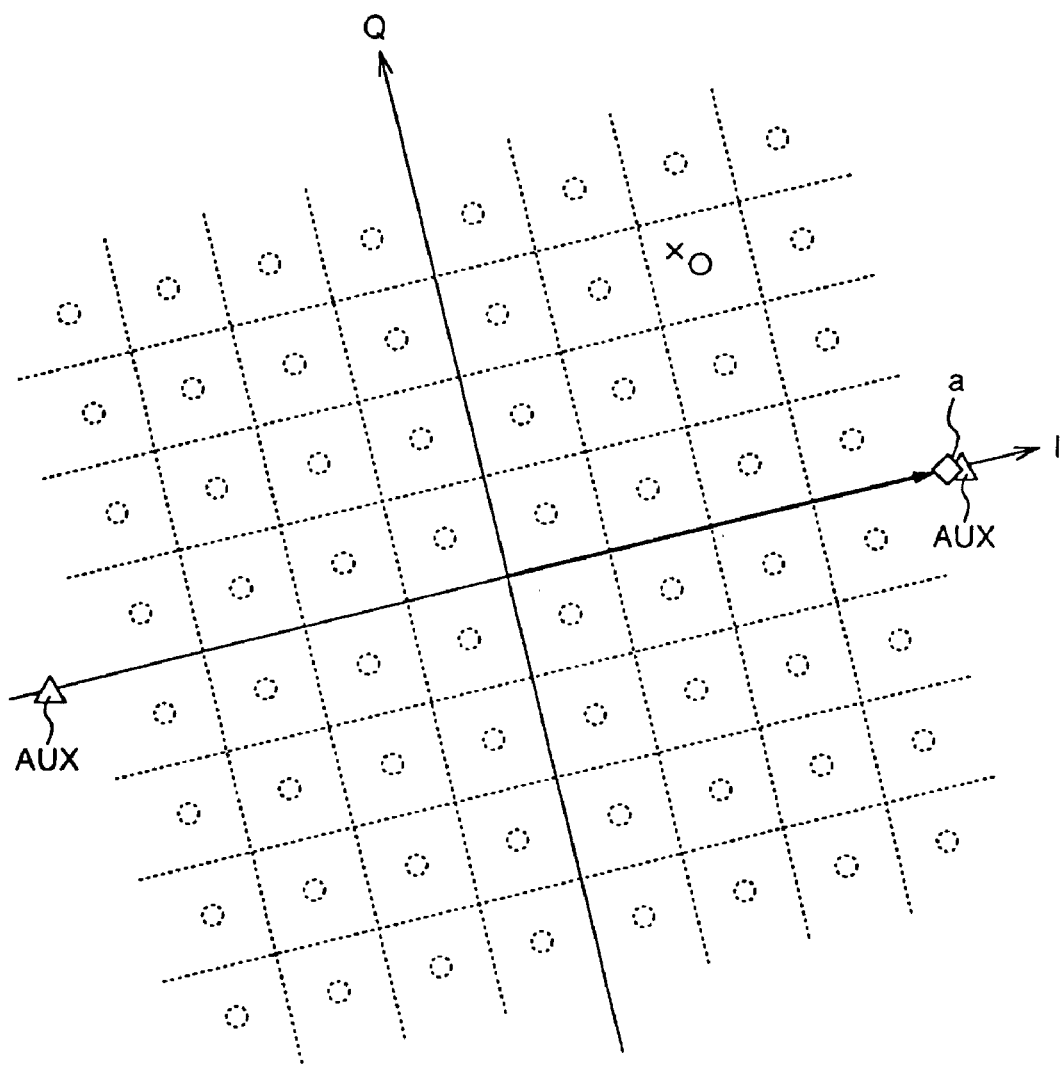
FIG. 7 is an explanatory diagram for rotation of the phase in a received signal.

FIG. 1 is a diagram showing exemplary signal point positioning for an auxiliary signal in one embodiment of the present invention, wherein a signal point a for a pilot signal "a" is represented by " ◊ ", and signal points for modulating an auxiliary signal "AUX" such as TMCC and AC are likewise represented by "Δ", in a manner similar to the prior art signal positioning shown in FIG. 6.

As can be seen in FIG. 1, the signal point "◊" of the pilot signal is positioned likewise on the I-axis on the complex plane, whereas the signal points "Δ" of the auxiliary signal are not positioned on the I-axis but on the Q-axis.

Here, the pilot signal is BPSK modulated with predetermined random codes for transmission. FIG. 1 shows that a BPSK demodulated pilot signal is displayed, as is the case in FIG. 6, such that it can be clearly indicated that the pilot signal is a signal which represents the coordinate point "a", and that scattering of signal points of main information codes is readily observed. It goes without saying, however, that a signal point before BPSK demodulation may be displayed instead.

Then, this embodiment is configured such that the signal points "Δ" for modulating the auxiliary signal are indicated at two upper and lower end positions on the Q-axis on the complex plane of FIG. 1, and the auxiliary signal is positioned on the Q-axis between the upper and lower two auxiliary signal points "Δ". Since the auxiliary signal is a signal modulated in accordance with it's polarity (+or −) in DBPSK scheme, the signal point of the auxiliary signal is indicated on either one of upper "Δ" or lower "Δ" on the Q-axis.

In other words, since the auxiliary signal is modulated in accordance with the DBPSK scheme as previously described, its signal point can only exist on any one of a plurality of straight lines passing through the origin on the complex plane, and the auxiliary signal is modulated such that its position from the origin represents information of the auxiliary signal contained therein. In this embodiment, the signal point of the auxiliary signal is arranged on the Q-axis.

As a result, the positioning of signal points in the embodiment of FIG. 1 differs from that of FIG. 6. In FIG. 6, the signal points of the auxiliary signal and the pilot signal represented by "Δ" and "◊" are the same position on Q-axis, whereas in FIG. 1, the signal points of the auxiliary signal represented by "Δ" are on Q-axis and the signal point of the pilot signal represented by "◊" is on the I-axis perpendicular to the Q-axis.

Consequently, as is apparent from FIG. 1, when signal points of all demodulated carriers are observed on the complex plane (constellation) using a vector scope or an oscilloscope for adjusting a receiver on the reception side, the signal points "Δ" for the auxiliary signal and the signal point "◊" for the pilot signal can be observed clearly separately from each other in this embodiment.

Therefore, according to this embodiment, the behavior of the signal points for the auxiliary signal can be observed clearly separately from the behavior of the signal point for the pilot signal, thereby making it possible to readily, rapidly and exactly analyze causes of a failure in the receiver and perform adjustment operations on the receiver.

While FIG. 1 has been described for the embodiment wherein the direction in which the signal points for the auxiliary signal are positioned is perpendicular to the direction in which the signal point for the pilot signal is positioned, the present invention is not limited to such positioning. The object of the present invention can be achieved as long as the behavior of signal points for auxiliary signal can be observed clearly separately from the behavior of a signal point for a pilot signal. Therefore, the present invention is not limited to the particular embodiment where the direction in which the signal points for the auxiliary signal are positioned is perpendicular to the direction in which the signal point for the pilot signal is positioned, and the two directions may form any angle other than a right angle.

In other words, the present invention only requires that a direction in which signal points for an auxiliary signal are positioned is deviated to some extent from a direction in which a signal point for a pilot signal is positioned. Accordingly, FIG. 2 shows a direction in which signal positions for an auxiliary signal are positioned in another embodiment of the present invention.

Figure 2:
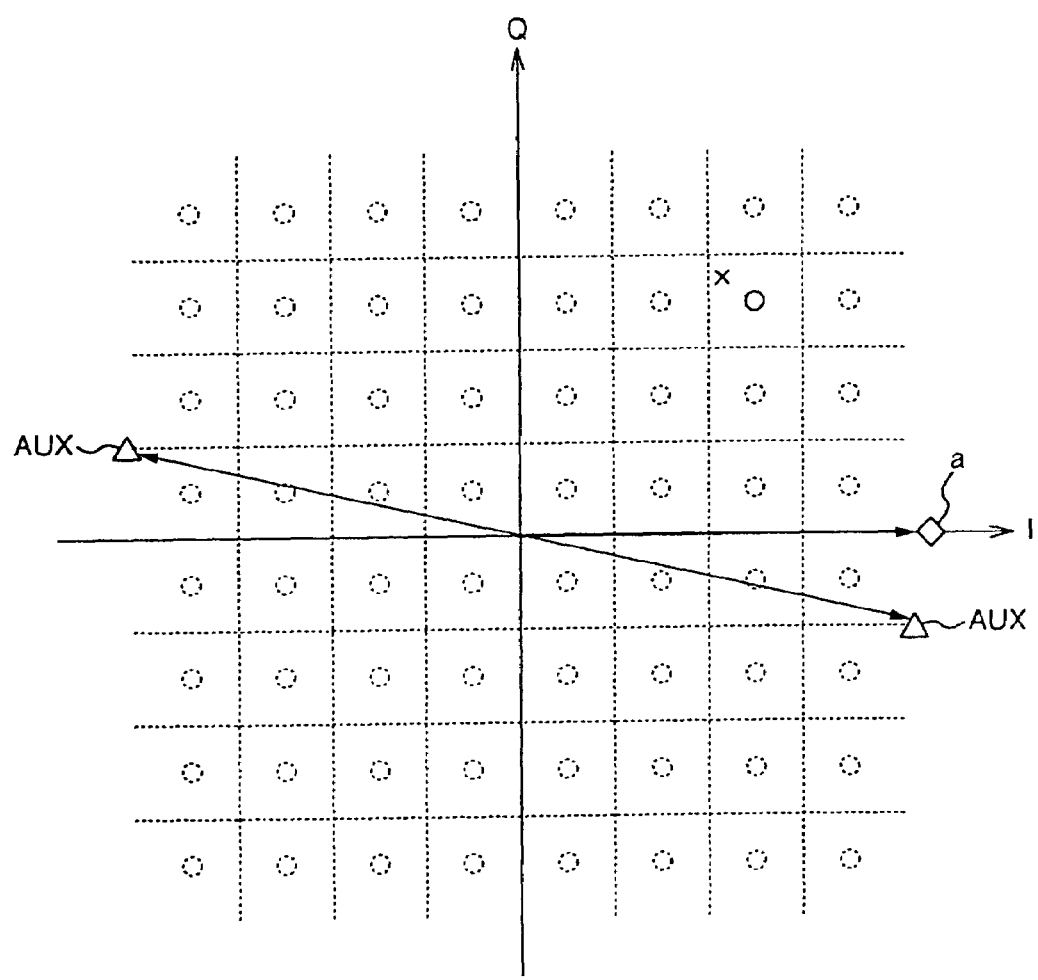
FIG. 2 is an explanatory diagram for showing positioning of signal points in a second embodiment of a digital modulation type signal transmission apparatus according to the present invention.

Specifically, FIG. 2 shows an embodiment where the direction in which signal points for an auxiliary signal are positioned is angled at several degrees in the clockwise direction from the I-axis on which a signal point for a pilot signal is positioned.

Therefore, the embodiment of FIG. 2 likewise permits the behavior of the signal points for the auxiliary signal to be observed clearly separately from the behavior of the signal point for the pilot signal, as is the case in the embodiment of FIG. 1, thereby making it possible to readily, rapidly and exactly analyze causes of a failure in a transmission apparatus and perform adjustment operations on the transmission apparatus. It should be understood that while the angular distance between the two directions shown in FIG. 2 is several degrees, the angular distance may be chosen to be 45 degrees or any other angle than that.

As described above, it can be the that the advantage of clearly separately displaying respective signal points can be most effectively utilized when an OFDM-based transmission apparatus is adjusted, so that the foregoing embodiments have been described for an OFDM-based transmission apparatus to which the present invention is applied.

However, it is obvious that similar effects can be generally provided in any transmission apparatus of the digital modulation scheme which uses a pilot signal for demodulating a modulated signal, wherein auxiliary signals are inserted in addition to a signal modulated with a main information code and a pilot signal and transmitted together with these signals, and therefore, the present invention is not limited to the foregoing embodiments.

In the embodiments of FIGS. 1 and 2, the pilot signal and the auxiliary signal are different in the direction of vector but identical in magnitude on the I-Q plane. Alternatively, in the present invention, the pilot signal and the auxiliary signal may be different in both the direction of vector and the magnitude on the I-Q plane, or may be identical in the direction of vector but different in magnitude. This is because, in any case, the signal point for the pilot signal is not overlapped with any of the signal points for the auxiliary signal on the constellation display on which they are displayed at different positions, so that these signals can be simultaneously observed in separation.

Next, an embodiment of a digital modulation type signal transmission system according to the present invention, which can implements the signal positioning shown in FIGS. 1 and 2, will be described with reference to a block diagram of FIG. 3.

Figure 3:
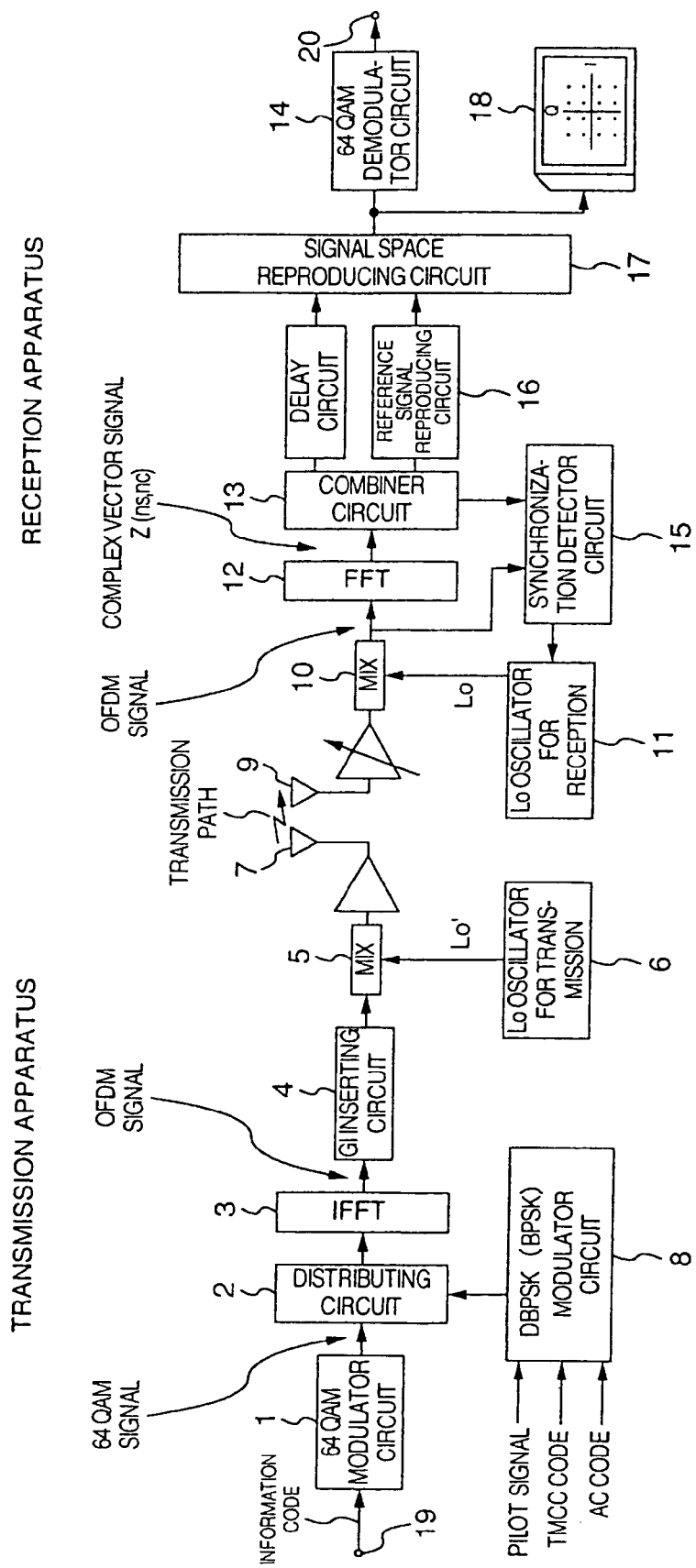
FIG. 3 is a block diagram illustrating an embodiment of a digital modulation type signal transmission system according to the present invention.
Figure 4:
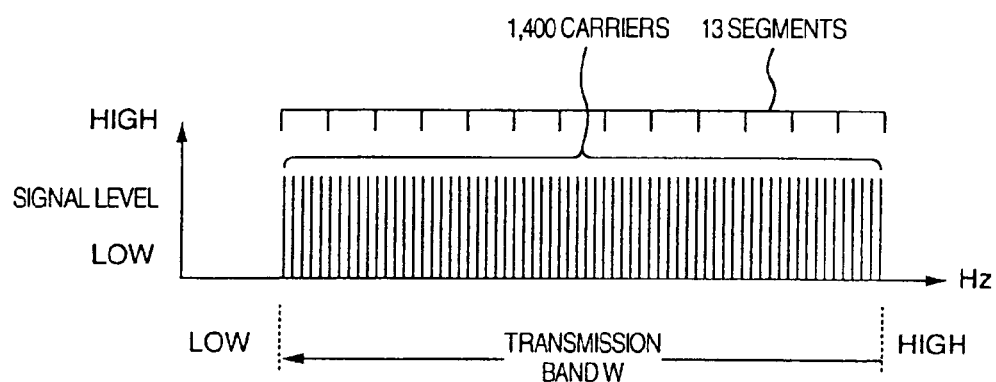
FIG. 4 is an explanatory diagram illustrating an exemplary structure of carriers in a terrestrial digital broadcasting system.
Figure 5:
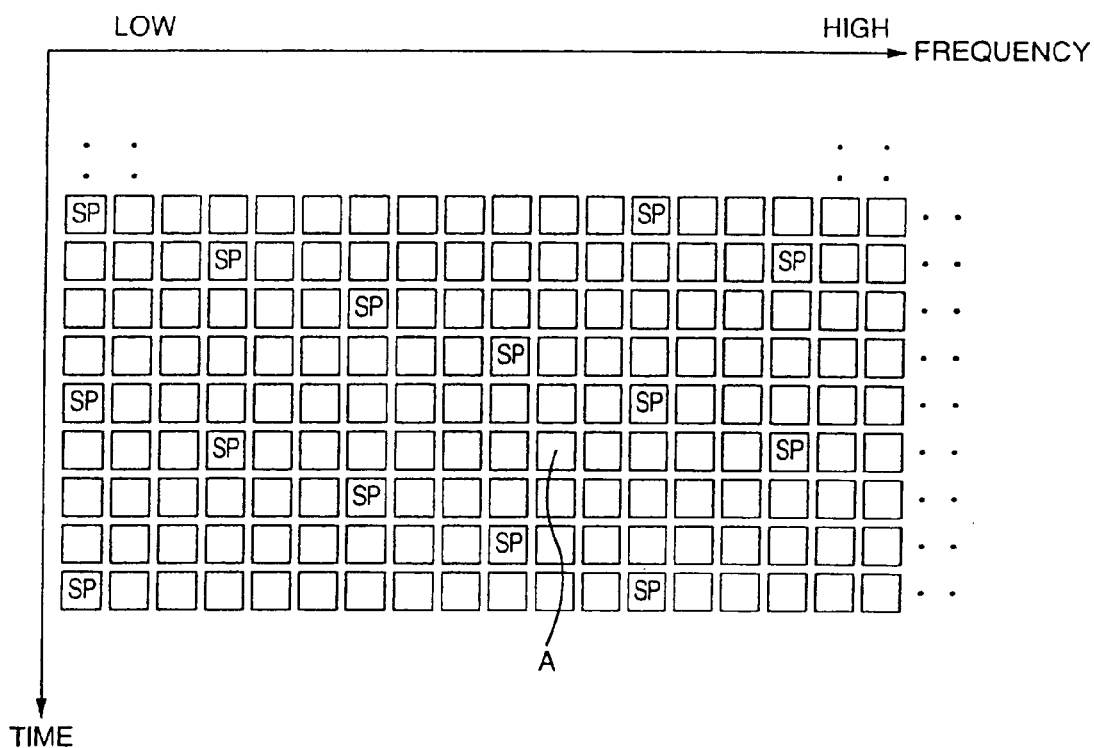
FIG. 5 is an explanatory diagram illustrating exemplary positioning of carriers in the terrestrial digital broadcasting system.

FIG. 3 is a basic block diagram of an OFDM-based transmission apparatus to which the present invention is applied. In the transmission apparatus, information codes are applied to an input terminal 19. This transmission apparatus modulates information codes to be transmitted to a complex vector signal in accordance with a 64QAM scheme in a 64QAM modulator circuit 1. This modulation processing involves partitioning a sequence of input information codes in units of six bits, determining the positions of the 6-bit codes on 64 signal points on the I-Q complex plane as shown in FIG. 1 each 6-bit signal corresponds to, and outputting a 64QAM modulated signal (a complex vector signal) corresponding to the coordinate representing the determined signal point.

The 64QAM modulated signal is assigned to a plurality of different carriers in a distributing circuit 2. In addition, a pilot signal (SP) and a TMCC signal and an AC signal, which are auxiliary signals, are modulated in accordance with the BPSK or DBPSK scheme in another modulator circuit 8, and the modulated auxiliary signals (complex vector signals) are inputted to the distributing circuit 2. The distributing circuit 2. The distributing circuit 2 assigns the 64QAM modulated signal which is a main information signal, the pilot signal (SP) from the modulator circuit 8, and the modulated TMCC signal and AC signals or auxiliary signals to respective carriers in accordance with a distribution table stored in a memory (not shown) contained within the distributing circuit 2. The distribution table has written therein data that indicates which signal is assigned to which carrier. Another modulator circuit 8 also contains a memory, not shown, that stores data as a mapping table for determining at which signal point positions (values of complex I and Q components) the pilot signal and the auxiliary signals are mapped on the I-Q plane. FIG. 8 shows an example of the mapping table stored in the memory device of modulation circuit 8. In the mapping table of FIG. 8, the signal point of the pilot signal is assigned to either one of the positions represented by the address "+1100" or "−1100" on I-axis according to the polarity, while the signal point of the auxiliary signal is assigned to either one of the positions represented by the address "+1100" or "−1100" on Q-axis according to the polarity. Settings for mapping the auxiliary signals at the signal points in FIG. 1 or FIG. 2, or at other signal points can be readily made only by changing the data which is set in the mapping table stored in the modulator circuit 8. Therefore, components of an existing transmission system can be utilized except for the setting of the mapping table, so that addition of special circuits or modification in performance is not required. Also, since the pilot signal is deterministic, the modulator circuit 8 is provided with a pilot signal generator (not shown) contained therein.

A plurality of carrier signals outputted from the distributing circuit 2 is inverse discrete fast Fourier transformed (IFFT) in an IFFT circuit 3. With this transform, the 64QAM signal is transformed into a baseband OFDM signal, multiplexed in accordance with the OFDM scheme, which is comprised of 1,400 carriers that have a symbol period of a time interval Ts', and are spaced by a frequency interval fs from each other and orthogonal to one another. Subsequently, a guard interval inserting circuit 4 adds a guard interval to the OFDM signal by copying an end portion of each symbol of the OFDM signal including several samplings, and adding to the head of the each symbol. This guard interval is inserted to increase the immunity to multipath fading. However, since this aspect is not related directly to the present invention, detailed description thereon is omitted. The OFDM signal having the guard interval added thereto is further inputted to a mixer 5 which multiplies the OFDM signal by a transmission side local oscillating signal Lo' at a high frequency, generated in a transmission side Lo oscillator 6, for frequency conversion into a signal in a high frequency band for radio wave. The resulting signal is power amplified and transmitted from a transmission antenna 7.

On the other hand, at a reception apparatus, a received signal received by a reception antenna 9 is amplified, and then inputted to a mixer 10 which multiplies the received signal by a reception side local oscillating signal Lo generated in a reception side Lo oscillator 11 for frequency conversion, to reproduce a multiplexed baseband OFDM signal. The OFDM signal is further discrete fast Fourier transformed (FFT) in an FFT circuit 12, and separated into complex vector signals Z(ns, nc) of the basebands of the respective carriers, where ns represents a symbol number of the received signal, and nc represents a carrier number of a separated carrier. The separated complex vector signals Z(ns, nc) of the respective carriers are classified into a 64QAM signal, a pilot signal, a TMCC signal, an AC signal and so on in a combiner circuit 13 in a process reverse to that in the distributing circuit 2. The separated pilot signal is inputted to a reference signal reproducing circuit 16 to reproduce a reference signal vector. The reproduced reference signal vector is inputted to a signal space reproducing circuit 17 together with all the signals which are delayed by a time required for the reference signal reproducing operation to reproduce the signal space coordinates in FIG. 1. The signals on signal points in the reproduced signal space coordinates are inputted to a 64QAM demodulator circuit 14 which demodulates the 64QAM signal and outputs from an output terminal 20 the results as information codes. The constellation in FIG. 1 is displayed by inputting the signal outputted from the signal space reproducing circuit 17 connected to an external display device 18 such as an oscilloscope or a vector scope.

The aforementioned embodiments are explained with referring to OFDM scheme digital modulation type signal transmission system. However, the present invention is not limited to the OFDM scheme transmission system. The present invention may be applied to other digital modulation type signal transmission system using a single carrier. Such single carrier type transmission system may be the same system structure shown in FIG. 3 other than the fact that the IFFT circuit 3 and GI (Guard Interval) inserting circuit 4, which are unique to the OFDM system, can be omitted from the system. Further, in the single carrier system, the distributing circuit 2 does not distribute the signals to the multiple carriers but distributing or arranging the signals such as a pilot signal and an auxiliary signal into a signal stream in time-divisional fashion by utilizing a switching device.

According to the present invention, a signal point for a pilot signal and a signal point for an auxiliary signal can be simultaneously observed completely separately from each other by a simple expedient of deviating a direction of the signal points for the auxiliary signal from the signal point for the pilot signal or making the signal levels different from each other, thereby making it possible to realize a digital modulation type signal transmission apparatus which can readily, rapidly and exactly analyze causes of a failure in the transmission apparatus and perform adjustment operations on the transmission apparatus without modifying the performance of the transmission apparatus which may use a conventional modulation scheme.

What is claimed is:

1. A digital modulation type signal transmission apparatus for digitally modulating a plurality of signals for transmission including a transmission side and a reception side, said transmission side comprising:
   an input terminal to which information codes are applied;
   a first modulation circuit coupled with said input terminal for assigning each of said information codes to any one of a plurality of signal points arranged on an I-Q complex plane and converting said information codes to first signals corresponding to coordinates of the assigned signal points;

a second modulation circuit for assigning a pilot signal used for demodulating said information codes, and an auxiliary signal including Transmission and Multiplexing Configuration Control (TMCC) information to be arranged on different signals points on the I-Q complex plane and converting said pilot signal and said auxiliary signal to respective second signals corresponding to coordinates of the assigned signal points; and a transmission unit coupled with said first and second modulation circuit for transmitting said first and second signals.

2. An apparatus according to claim 1, wherein said transmission unit includes a distributing circuit for distributing said first and second signals from said first and second modulation circuit to a plurality of different carriers, respectively.

3. An apparatus according to claim 2, wherein a direction of the position of the signal point for said auxiliary signal from the origin of said I-Q complex plane is oriented at a right angle to a direction of the position of the signal point for said pilot signal from the origin of said I-Q complex plane.

4. An apparatus according to claim 1, wherein said transmission unit includes a distribution circuit for distributing said first and second signals from said first and second modulaion circuit to a single carrier in a time-division manner.

5. An apparatus according to claim 1, wherein said auxiliary signal and said pilot signal are positioned such that the position of the signal point for said auxiliary signal is different from the position of the signal point for said pilot signal in a direction from the origin of said I-Q complex plane.

6. An apparatus according to claim 1, wherein said second modulation circuit assigns said pilot signal and said auxiliary signal in accordance with one of a BPSK scheme and a DBPSK scheme.

7. An apparatus according to claim 6, wherein said pilot signal is positioned on the I-axis on said I-Q complex plane, and said auxiliary signal is positioned on the Q-axis.

8. An apparatus according to claim 6, wherein said apparatus uses an orthogonal frequency division multiplexing modulation (OFDM) scheme for transmitting said information code with a plurality of orthogonal function based carriers, said carriers being modulated with said information code by a modulation method to which synchronous detection can be applied.

9. An apparatus according to claim 1, further comprising:
a display device on the reception side, said display device displaying said I-Q complex plane on a display screen thereof, and displaying a signal point for said information code, a signal point for said pilot signal, and a signal point for said auxiliary signal on said I-Q complex plane on said display screen, wherein the signal point for said auxiliary signal is displayed at a position different from a position at which the signal point for said pilot signal is displayed.

10. In a digital modulation signal transmission apparatus for digitally modulating a plurality of signals for transmission, including a transmission side and a reception side, a method of displaying a received signal in said reception side comprising the steps of:
receiving a transmission signal from said transmission side in which each of information codes are assigned to any one of a plurality of signal points arranged on an I-Q complex plane, a pilot signal used for demodulating said information codes and an auxiliary signal including Transmission and Multiplexing Configuration Control (TMCC) information are assigned to be arranged on different signal points on the I-Q complex plane, said transmission signal being a signal modulated based on coordinates corresponding to the assigned signal points,
displaying said I-Q complex plane on a screen of a display device provided at said reception side;
displaying said signal point of said information code demodulated from said received transmission signal on said I-Q complex plane;
displaying a signal point of said pilot signal demodulated from said received signal on a predetermined first position on said I-Q complex plane; and
displaying a signal point of said auxiliary signal demodulated from said received transmission signal on a predetermined second position different from said first position on said I-Q complex plane.

11. A signal display method according to claim 10, wherein said auxiliary signal and said pilot signal are positioned such that the displayed position of the signal point for said auxiliary signal is different from the displayed position of the signal point for said pilot signal in a direction from the origin of said I-Q complex plane.

12. A signal display method according to claim 11, wherein a direction of the position of the signal point for said auxiliary signal from the origin of said I-Q complex plane is oriented at a right angle to a direction of the position of the signal point for said pilot signal from the origin of said I-Q complex plane.

13. A signal display method according to claim 12, wherein said pilot signal is positioned on the I-axis on said I-Q complex plane, and said auxiliary signal is positioned on the Q-axis.

14. A signal transmission/reception system for digital modulating comprising:
a transmission unit, wherein each of information codes is assigned to any one of a plurality of signal points arranged on an I-Q complex plane, a pilot signal used for demodulating said information codes and an auxiliary signal are assigned to be arranged on signals points on the I-Q complex plane, the signal points of said auxiliary signal and said pilot signal are arranged on different positions on said I-Q complex plane, for transmitting a transmission signal which is modulated based on coordinates corresponding to the assigned signal points; and
a reception unit which receives and demodulate the transmission signal to reproduce the information codes.

* * * * *